United States Patent
Han et al.

(10) Patent No.: US 12,330,635 B2
(45) Date of Patent: Jun. 17, 2025

(54) VEHICLE PASSENGER ACCIDENT PREVENTION SYSTEM AND CONTROL METHOD FOR THE SAME

(71) Applicants: HYUNDAI MOTOR COMPANY, Seoul (KR); KIA CORPORATION, Seoul (KR)

(72) Inventors: Sangweol Han, Hwaseong-si (KR); Hwa Sun Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 248 days.

(21) Appl. No.: 17/988,254

(22) Filed: Nov. 16, 2022

(65) Prior Publication Data
US 2023/0150487 A1  May 18, 2023

(30) Foreign Application Priority Data

Nov. 17, 2021  (KR) .......................... 10-2021-0158670

(51) Int. Cl.
*B60W 30/09* (2012.01)
*B60R 22/48* (2006.01)
(Continued)

(52) U.S. Cl.
CPC ............ *B60W 30/09* (2013.01); *B60R 22/48* (2013.01); *B60W 10/04* (2013.01); *B60W 10/18* (2013.01);
(Continued)

(58) Field of Classification Search
CPC ............ B60R 22/48; B60R 2022/4808; B60R 2022/4866; B60R 2022/4891;
(Continued)

(56) References Cited

U.S. PATENT DOCUMENTS 6,470,731 B1 * 10/2002 Rieth .................. B60K 31/0008
73/9
6,889,140 B2 * 5/2005 Isogai .................. B60T 8/17558
180/170
(Continued)

FOREIGN PATENT DOCUMENTS

CN 111376901 A * 7/2020 ............ B60W 30/09
CN 118025093 A * 5/2024
(Continued)

*Primary Examiner* — Mark L. Greene
(74) *Attorney, Agent, or Firm* — Lempia Summerfield Katz LLC

(57) ABSTRACT

A vehicle passenger accident prevention system includes a vehicle operation status measurement unit that measures operation states of a vehicle and outputs corresponding signals, a driving unit to drive the vehicle, a braking unit to brake the vehicle, a FCA system that controls the operation of the driving unit and the braking unit, and a controller that detects the seated state of a passenger in the vehicle or a wearing state of a seat belt according to the output signal of the vehicle operation status measurement unit. In particular, the controller controls the operation of the FCA system according to a predetermined control mode in advance when a standing passenger in the vehicle is detected or an unbuckled seat belt is detected.

18 Claims, 4 Drawing Sheets

(51) Int. Cl.
  *B60W 10/04* (2006.01)
  *B60W 10/18* (2012.01)
  *B60W 30/16* (2020.01)
  *B60W 40/02* (2006.01)
  *B60W 40/08* (2012.01)
  *B60W 50/14* (2020.01)

(52) U.S. Cl.
  CPC ............ *B60W 30/16* (2013.01); *B60W 40/02* (2013.01); *B60R 2022/4808* (2013.01); *B60R 2022/4866* (2013.01); *B60R 2022/4891* (2013.01); *B60W 2040/0881* (2013.01); *B60W 50/14* (2013.01); *B60W 2420/403* (2013.01); *B60W 2540/049* (2020.02); *B60W 2540/223* (2020.02); *B60W 2554/80* (2020.02); *B60W 2554/802* (2020.02); *B60W 2555/20* (2020.02); *B60Y 2200/143* (2013.01)

(58) Field of Classification Search
  CPC ...... B60W 10/04; B60W 10/18; B60W 30/09; B60W 30/16; B60W 40/02; B60W 50/14; B60W 2050/143; B60W 2050/146; B60W 2040/0881; B60W 2420/403; B60W 2540/049; B60W 2554/20–806; B60W 2555/20; B60K 28/00–165; B60Y 2200/143; G05D 1/0061; G05D 1/0088; G05D 1/021; G05D 1/0214; G05D 1/0221; G05D 1/0223
  See application file for complete search history.

(56) References Cited

U.S. PATENT DOCUMENTS

2020/0130710 A1\* 4/2020 Hase .................. B60W 30/182
2024/0208513 A1\* 6/2024 Kim ..................... B60W 40/13

FOREIGN PATENT DOCUMENTS

| | | | | |
|---|---|---|---|---|
| DE | 102017205092 A1 | \* | 9/2018 | ............ B60T 13/665 |
| JP | 2015205648 A | \* | 11/2015 | |
| KR | 19980050277 U | \* | 10/1998 | |
| KR | 102200803 B1 | \* | 1/2021 | |
| TW | 201518145 A | \* | 5/2015 | |

\* cited by examiner

VEHICLE PASSENGER ACCIDENT PREVENTION SYSTEM AND CONTROL METHOD FOR THE SAME

CROSS-REFERENCE TO RELATED APPLICATION

This application claims priority to and the benefit of Korean Patent Application No. 10-2021-0158670, filed in the Korean Intellectual Property Office on Nov. 17, 2021, the entire contents of which are incorporated herein by reference.

BACKGROUND

(a) Field

The present disclosure relates to a vehicle passenger accident prevention system and a method for the same. In more detail, a vehicle passenger accident prevention system for preventing an accident of a passenger seated inside the vehicle when the forward collision avoidance assist system is operated and method for the same.

(b) Description of the Related Art

A forward collision avoidance assist system (FCA), also called automatic emergency braking, is an evolutionary system from forward collision warning. The forward collision avoidance assist system detects a collision situation with a vehicle or pedestrian in front in advance, calculates the time until collision with a vehicle or pedestrian in front, sends a warning sound to the driver, and controls vehicle braking.

However, when the forward collision avoidance assist system applied to a multi-use vehicle operates, a number of safety accidents for passengers may occur. In particular, in the case of a commercial bus, there may be a passenger on a standing, a passenger may move while the vehicle is moving, or there may be a case where the passenger stands up to get off before the bus arrives at its destination. At this time, when a sudden stop is made by the forward collision avoidance assist system, there are cases in which passengers are injured. In particular, in the case of a double-decker bus, the forward collision avoidance assist system operates while the passenger is moving from the second floor to the first floor, and there is a possibility of a fall accident.

The above information disclosed in this Background section is provided only to enhance understanding of the background of the present disclosure. Therefore, it may contain information that does not form the prior art that is already known to a person of ordinary skill in the art.

SUMMARY

The present disclosure has been made in an effort to provide a vehicle passenger accident prevention system and a method for the same operating a forward collision avoidance assist system in advance in consideration of the passenger's seating state, etc.

A vehicle passenger accident prevention system according to an embodiment of the present disclosure may include a vehicle operation status measurement unit that measures operation states of a vehicle and outputs corresponding signals, a driving unit to drive the vehicle, a braking unit to brake the vehicle, a FCA system that controls the operation of the driving unit and the braking unit, and a controller that detects the seated state of a passenger in the vehicle or a wearing state of a seat belt according to the output signal of the vehicle operation status measurement unit. In particular, the controller controls the operation of the FCA system according to a predetermined control mode in advance when a standing passenger in the vehicle is detected or an unbuckled seat belt is detected.

The vehicle operation status measurement unit may include: a passenger count sensor which detects the passenger when the passenger enters or leaves the vehicle and outputs the corresponding output signal, a sitting detecting sensor that determines whether a passenger is seated in the seat and outputs the corresponding signal, and a belt wearing detecting sensor that detects whether a seat belt is buckled and outputs the corresponding signal.

The controller may determine the seated state of a passenger in the vehicle by subtracting the number of seated passengers detected by the sitting detecting sensor from the number of passenger occupants detected by the passenger count sensor. The controller may determine the wearing state of the seat belt of the corresponding seat according to output signals of the sitting detecting sensor and the belt wearing detecting sensor.

The vehicle passenger accident prevention system according to an embodiment of the present disclosure may further include a display system that displays the seating status of the passenger in the vehicle or the wearing status of the seat belt of the seat.

The display system may display the operating state of the FCA system.

The vehicle passenger accident prevention system according to an embodiment of the present disclosure may further include a voice guidance system for warning the wearing state of the seat belt of the seat or the seated state of the passenger in the vehicle.

The vehicle operation status measurement unit may further include: a vehicle speed sensor that measures the vehicle speed and outputs the corresponding signal, a distance sensor that measures a distance to the vehicle in front and outputs the corresponding signal, and an optical camera that captures surrounding images of the vehicle and outputs the corresponding signals. The controller may determine whether the operation condition of the FCA system is satisfied according to the output signals of the vehicle speed sensor, the distance sensor and the optical camera.

The control mode may include an FCA system preemptive operation mode to operate the FCA system in advance it is determined that there is a standing passenger in the vehicle or there is an unbuckled seat belt according to the output signal of the vehicle operation status measurement unit.

The control mode may further include an FCA system normal mode to operate the FCA system normally when it is determined that an operation condition of the FCA system is satisfied according to the output signal of the vehicle operation status measurement unit and it is determined that there is no standing passenger in the vehicle and there is no unbuckled seat belt according to the output signal of the vehicle operation status measurement unit. The unbuckled seat belt indicates an unbuckled passenger in the vehicle.

In the FCA system preemptive operation mode, the controller may operate the FCA system by applying a predetermined preemptive collision duration that is increased more than a predetermined collision duration in the FCA system normal mode.

In the FCA system preemptive operation mode, the controller may operate the FCA system by applying a predetermined preemptive vehicle deceleration rate that is further reduced than a predetermined vehicle deceleration rate in the FCA system normal mode.

The vehicle passenger accident prevention system according to an embodiment of the present disclosure may further include an advanced smart cruise control (ASCC) system including a function of maintaining an inter-vehicle distance with the front vehicle. The control mode may further include an inter-vehicle distance preemptive operation mode to operate the ASCC system in advance before the operation of the FCA system when it is determined to correspond to the operation condition of the FCA system according to the output signal of the vehicle operation status measurement unit, it is determined that there is a standing passenger in the vehicle or there is an unbuckled seat belt according to the output signal of the vehicle operation status measurement unit, and it is determined to correspond to a predetermined inter-vehicle distance preemptive operation condition according to the output signal of the vehicle operation status measurement unit.

The controller may calculate the collision duration according to the signals output from the vehicle speed sensor and the distance sensor, and if the calculated collision duration is longer than the predetermined collision duration, the controller may determine that the vehicle-to-vehicle distance preemptive operation mode is applicable.

In the inter-vehicle distance preemptive operation mode, the controller may operate the ASCC system by applying a predetermined inter-vehicle distance longer than the predetermined inter-vehicle distance in the FCA system normal mode.

The vehicle passenger accident prevention system according to an embodiment of the present disclosure may further include an ASCC system including a function of maintaining an inter-vehicle distance with the front vehicle The control mode may further include an environment preemptive operation mode to operate the ASCC system in advance before the operation of the FCA system when it is determined to correspond to the operation condition of the FCA system according to the output signal of the vehicle operation status measurement unit, it is determined that there is a standing passenger in the vehicle or there is an buckled seat belt according to the output signal of the vehicle operation status measurement unit, and it is determined to correspond to a predetermined environmental preemptive operation condition according to the output signal of the vehicle operation status measurement unit.

The vehicle operation status measurement unit may further include an outside temperature sensor that measures the outside temperature and outputs the corresponding signal, a rain sensor detecting rain, snow, etc. and outputting a corresponding signal, and a blind spot detection (BSD) system that detects the presence of objects around the vehicle and outputs the corresponding signal. The controller may determine whether it corresponds to the environment preemptive operation mode according to the output signal of the outside temperature sensor, the rain sensor or the BSD system.

The controller may control the operation of the ASCC system to reduce the vehicle speed to a predetermined speed if it is determined that the controller corresponds to the environment preemptive operation mode.

A control method according to an embodiment of the present disclosure may be applied to a vehicle passenger accident prevention system including a vehicle operation status measurement unit having a passenger count sensor which detects the passenger when the passenger enters or leaves the vehicle and outputs the corresponding output signal. The vehicle operation status measurement unit further includes: a sitting detecting sensor to detect whether a passenger is seated in the seat and output the corresponding signal, a belt wearing detecting sensor that detects whether a seat belt is buckled and outputs the corresponding signal, a vehicle speed sensor that measures the vehicle speed and outputs the corresponding signal, a distance sensor that measures the distance to the vehicle in front and outputs the corresponding signal, and an optical camera that captures surrounding images of the vehicle and outputs the corresponding signal. The vehicle passenger accident prevention system further includes: a driving unit to drive the vehicle, a braking unit to brake the vehicle, a FCA system that controls the operation of the driving unit and the braking unit, and a controller that detects the seated state of a passenger in the vehicle or a wearing state of a seat belt according to the output signal of the vehicle operation status measurement unit. In particular, the controller controls the operation of the FCA system according to a predetermined control mode in advance when a standing passenger in the vehicle is detected or an unbuckled seat belt is detected. In another embodiment, the control method may include: determining, by the controller, the seated state of a passenger in the vehicle by subtracting the number of seated passengers detected by the sitting detecting sensor from the number of passenger occupants detected by the passenger count sensor; determining, by the controller, the wearing state of the seat belt of the corresponding seat according to output signals of the sitting detecting sensor and the belt wearing detecting sensor; and determining, by the controller, whether the FCA system is in the operation condition based on whether a collision is expected according to the output signals from the vehicle speed sensor, the distance sensor and the optical camera. The control method may further include: performing, by the controller, an FCA system normal mode to operate the FCA system normally if the controller determines that the FCA system is in the operation condition of and there is no standing passenger in the vehicle, and there is no unbuckled seat belt; and performing, by the controller, an FCA system preemptive operation mode by applying a predetermined preemptive collision duration that is increased more than a predetermined collision duration in the FCA system normal mode and applying a predetermined preemptive vehicle deceleration rate that is further reduced than a predetermined vehicle deceleration rate in the FCA system normal mode if it is determined that the operation condition of the FCA system is satisfied, and it is determined that there is a standing passenger in the vehicle or there is an unbuckled seat belt. The vehicle passenger accident prevention system may further include an ASCC system having a function of maintaining an inter-vehicle distance with the front vehicle. The control method may further include performing, by the controller, an inter-vehicle distance preemptive operation mode to operate the ASCC system in advance before the operation of the FCA system when it is determined to correspond to the operation condition of the FCA system according to the output signal of the vehicle operation status measurement unit, it is determined that there is a standing passenger in the vehicle or there is an unbuckled seat belt according to the output signal of the vehicle operation status measurement unit, and it is determined to correspond to a predetermined inter-vehicle distance preemptive operation condition according to the output signal of the vehicle operation status measurement unit.

The vehicle operation status measurement unit may further include: an outside temperature sensor that measures the outside temperature and outputs the corresponding signal; a rain sensor detecting rain, snow, etc. and outputting a corresponding signal; and a BSD system that detects the presence of objects around the vehicle and outputs the corresponding signal. The control method may further include performing, by the controller, an environment preemptive operation mode to operate the ASCC system in advance before the operation of the FCA system if the controller corresponds to the predetermined environmental preemptive operation mode according to the output signal of the outside temperature sensor, the rain sensor or the BSD system.

The control method may further include controlling, by the controller, the operation of the driving unit and the braking unit to prohibit the departure of the vehicle when the controller determines that there is a standing passenger in the vehicle or there is an unbuckled seat belt before departure of the vehicle.

Through the means of solving the above problems, the vehicle passenger accident prevention system and the method according to the present disclosure may secure a safe distance with other vehicles by limiting the amount of acceleration of the vehicle when there is a standing passenger on the vehicle.

During driving, a vehicle speed and a vehicle deceleration rate may be reduced compared to a normal operation according to the additional function operation of the forward collision avoidance assist system.

Accordingly, it is possible to comprehensively prevent safety accidents for standing passengers.

In addition, for the effects that can be obtained or predicted due to an embodiment of the present disclosure, it is to be disclosed directly or implicitly in the detailed description of the embodiment of the present disclosure. Various effects predicted according to the embodiment of the present disclosure should be disclosed within a detailed description described below.

DETAILED DESCRIPTION

Figure 1:
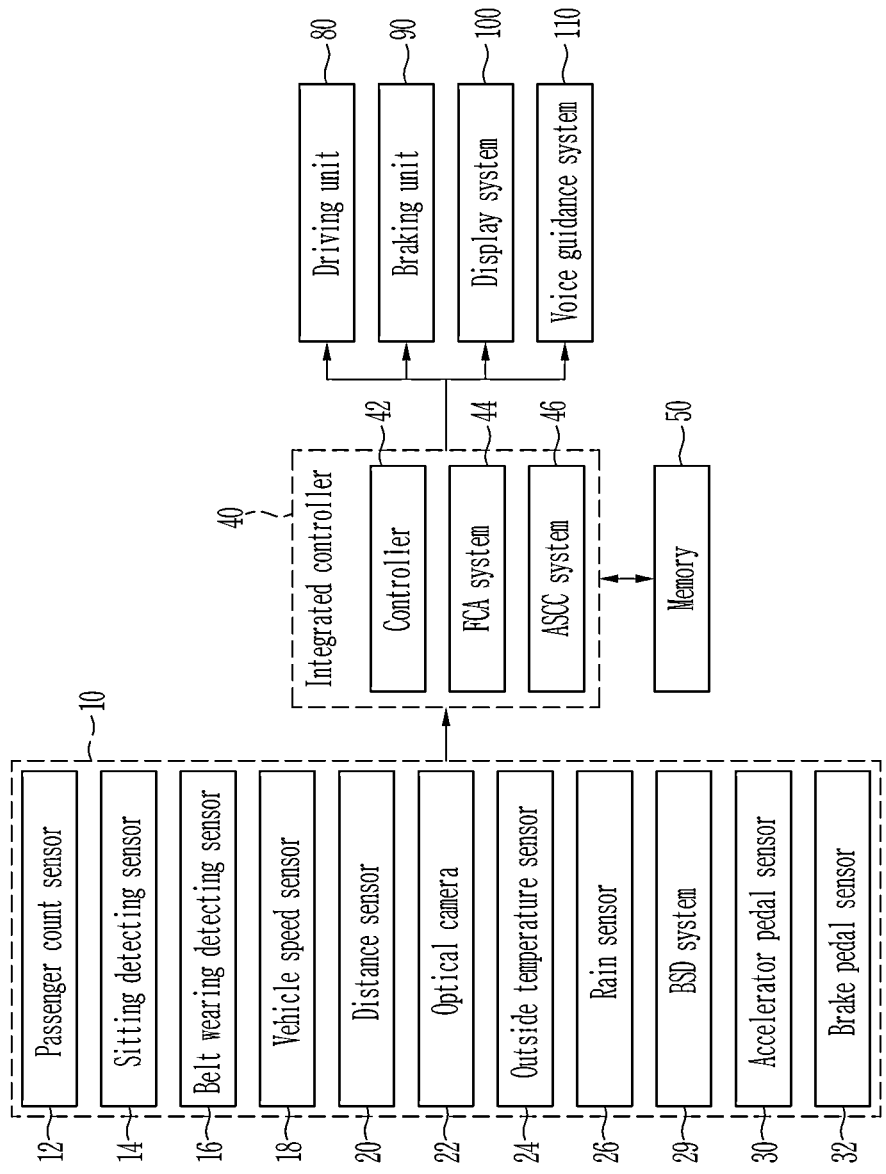
FIG. 1 is a block diagram showing a configuration of a vehicle passenger accident prevention system according to an embodiment of the present disclosure.

The present disclosure is described more fully hereinafter with reference to the accompanying drawings, in which embodiments of the present disclosure are shown.

As those having ordinary skill in the art would realize, the described embodiments may be modified in various different ways, all without departing from the spirit or scope of the present disclosure.

The terminology used herein is for the purpose of describing particular embodiments only, and is not intended to limit the present disclosure.

As used herein, singular forms are intended to also include a plurality of forms, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

In order to clearly describe the present disclosure, parts irrelevant to the description are omitted, and the same reference numerals are assigned to the same or similar elements throughout the specification.

Since the size and thickness of each component shown in the drawing are arbitrarily indicated for convenience of explanation, the present disclosure is not necessarily limited to that shown in the drawing, and the thickness is enlarged to clearly express various parts and areas.

In addition, in the detailed description below, the reason that the names of the components are divided into first, second, etc. is to classify the components in the same relationship, and the order is not necessarily limited in the following description.

Throughout the specification, when it is said that a certain part includes certain constituent elements, this means that other constituent elements may be further included, rather than excluding other constituent elements, unless specifically stated otherwise.

As used herein, the term "and/or" includes any one or all combinations of the associated listed items.

FIG. 1 is a block diagram showing a configuration of a vehicle passenger accident prevention system according to an embodiment of the present disclosure.

Referring to FIG. 1, the vehicle passenger accident prevention system may include: a vehicle operation status measurement unit 10 that measures operation states of a vehicle and outputs corresponding signals, a driving unit 80 to drive the vehicle, a braking unit 90 to brake the vehicle, a forward collision avoidance assist system 44 (Hereinafter, it is called 'FCA system') that controls the operation of the driving unit 80 and the braking unit 90, and a controller 42 that detects the seated state of a passenger in the vehicle or a wearing state of a seat belt according to the output signal of the vehicle operation status measurement unit 10. In particular, the controller 42 controls the operation of the FCA system 44 according to a predetermined control mode in advance when a standing passenger in the vehicle is detected or an unbuckled seat belt is detected. The unbuckled seat belt is detected when a passenger in the vehicle does not buckle up the seat belt.

The driving unit 80 to drive a vehicle may include a general engine (e.g., an internal combustion engine), the combination of an engine and a motor, or a motor. The braking unit 90 may include a physical brake, an automatic brake and/or a brake, and a regenerative braking system.

The FCA system 44 detects a collision situation with a vehicle or a pedestrian in advance, calculates a time-to-collision (TTC) of the vehicle or pedestrian (e.g., a pedestrian in front of the vehicle), sends a warning sound to the driver, and controls the vehicle's braking.

For example, the FCA system 44 may control the operation of the braking unit 90, or the braking unit 90 and the driving unit 80.

The vehicle operation status measurement unit 10 may include: a passenger count sensor 12, which detects the passenger when the passenger enters or leaves the vehicle and outputs the corresponding output signal; a sitting detecting sensor 14 to detect whether a passenger is seated in the seat and output the corresponding signal; and a belt wearing detecting sensor 16 that detects whether a seat belt is buckled or unbuckled and outputs the corresponding signal.

In one embodiment, the passenger count sensor 12 is an optical sensor disposed near the vehicle door where the passenger gets on and off and counts the number of passengers who are getting on and off, and then outputs the corresponding signal to the controller 42.

In one embodiment, the sitting detecting sensor 14 is an optical sensor or pressure sensor, which may be disposed near a seat or in a seat of a vehicle, and detects a state in which a passenger is sitting on the seat, and then outputs the corresponding signal to the controller 42.

The belt wearing detecting sensor 16 may detect whether a seat belt is buckled as a pressure sensor or a current detecting sensor and output the corresponding signal to the controller 42.

The controller 42 may determine the seating status of the passenger in the vehicle.

In detail, the controller 42 may determine the seated state of a passenger in the vehicle by subtracting the number of seated passengers detected by the sitting detecting sensor 14 from the number of passengers in the vehicle detected by the passenger count sensor 12.

In addition, the controller 42 may determine whether each passenger is wearing the seat belt.

In other words, the controller 42 may determine each passenger's state of wearing the seat belt of the corresponding seat according to output signals of the sitting detecting sensor 14 and the belt wearing detecting sensor 16.

In addition, the vehicle operation status measurement unit 10 may further include an accelerator pedal sensor 30 that measures an accelerator opening state and outputs the corresponding signal, and a brake pedal sensor 32 that measures a brake operation state and outputs the corresponding signal.

Figure 2:
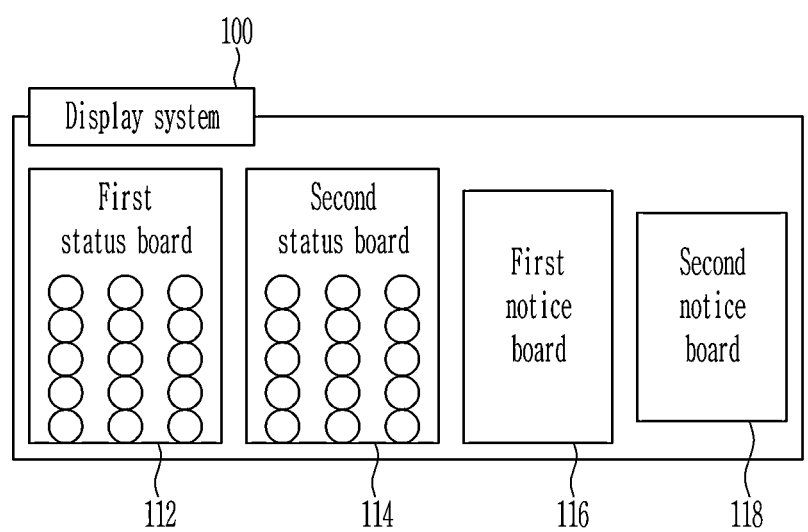
FIG. 2 is a drawing showing a display system that may be applied to a vehicle passenger accident prevention system according to an embodiment of the present disclosure.

FIG. 2 is a drawing showing a display system that may be applied to a vehicle passenger accident prevention system according to an embodiment of the present disclosure.

Referring to FIG. 2, the vehicle passenger accident prevention system according to an embodiment of the present disclosure may further include a display system 100 for displaying the seating state of the passenger in the vehicle or the wearing state of the seat belt of the seat.

The display system 100 may display the operation status of the FCA system 44.

In one embodiment, the display system 100 may include one or a plurality of status boards 112 and 114 and/or one or a plurality of notice boards 116, and 118.

In one embodiment, the status boards 112 and 114 may indicate the seating status of the passenger and the wearing status of the seat belt for each vehicle seat.

For example, the seating status of the passengers in the front and rear of the vehicle and the wearing status of the seat belt may be displayed on the first panel 112 and the second panel 114. In the case of a double-decker bus, the seating status of the passengers on the $1^{st}$ and $2^{nd}$ floors of the vehicle and the wearing status of the seat belt may also be displayed on the first panel 112 and the second panel 114.

A warning about the operation of the FCA system 44 may be displayed on the first notice board 116, or the operation limit of the FCA system 44 may be indicated on the second notice board 118.

The warning for the operation of the FCA system 44 may inform the driver and passenger of the operation situation of the FCA system 44 in advance, and the operation limit of the FCA system 44 may include information such as limit of engine rpm for passenger protection.

The display system 100 may be a plurality of divided separate displays, or a plurality of situations or warnings may be displayed on one display.

Since the configuration and operation of the display system 100 are obvious to those having ordinary skill in the art, a detailed description thereof has been omitted.

The vehicle passenger accident prevention system according to an embodiment of the present disclosure may further include a voice guidance system 110 for warning the wearing state of the seat belt of the seat or the seated state of the passenger in the vehicle.

The voice guidance system 110 may perform announcements such as the operation or restriction of the FCA system 44 for the driver, a seating warning for the passenger, and a warning about wearing a seat belt.

Referring to FIG. 1, the vehicle operation status measurement unit 10 may include a vehicle speed sensor 18 that measures the vehicle speed and outputs the corresponding signal, a distance sensor 20 that measures the distance to the vehicle in front and outputs the corresponding signal, and an optical camera 22 that captures surrounding images of the vehicle and outputs the corresponding signal.

The distance sensor 20 may detect a vehicle or a pedestrian in front of the distance sensor using radar and output the corresponding signal to the controller 42.

The controller 42 may determine whether the operation condition of the FCA system 44 is satisfied according to the output signals of the vehicle speed sensor 18, the distance sensor 20 and the optical camera 22.

The operation condition of the FCA system 44 means a condition in which the risk of collision with other vehicles, pedestrians or objects is expected based on the current driving situation of the vehicle, which is obvious to those skilled in the art and detailed description is omitted.

Hereinafter, the control mode performed by the controller 42 is described.

The control mode may include an FCA system normal mode to operate the FCA system 44 normally when it is determined that an operation condition of the FCA system 44 is satisfied according to the output signal of the vehicle operation status measurement unit 10, and it is determined that there is no standing passenger in the vehicle and there is no unbuckled seat belt according to the output signal of the vehicle operation status measurement unit 10.

For example, the controller 42 determines whether the operation condition of the FCA system 44 corresponds to the output signal of the vehicle speed sensor 18, the distance sensor 20 and the optical camera 22.

In addition, the controller 42 determines the presence or absence of a standing passenger in the vehicle and the presence or absence of a passenger not wearing a seat belt (i.e., an unbuckled passenger sitting in a seat) according to the output signals of the passenger count sensor 12, the sitting detecting sensor 14 and the belt wearing detecting sensor 16.

The normal operation of the FCA system 44 may include a series of processes for example that when the controller 42 detects a risk of collision, it warns through the display system 100 and/or the voice guidance system 110, when the controller 42 determines that the risk of collision is increased, the controller 42 limits the output of the driving unit 80 and operates the braking unit 90, and also the controller 42 performs emergency braking of the braking unit 90 if the controller 42 determines that a collision risk is imminent.

The control mode may include an FCA system preemptive operation mode to operate the FCA system 44 in advance when it is judged to correspond to the operation condition of the FCA system 44 according to the output signal of the vehicle operation status measurement unit 10, and it is determined that there is a standing passenger in the vehicle or there is an unbuckled passenger according to the output signal of the vehicle operation status measurement unit 10.

In the FCA system preemptive operation mode, the controller 42 may operate the FCA system 44 by applying a predetermined preemptive collision duration that is increased more than a predetermined collision duration in the FCA system normal mode.

For example, in the FCA system normal mode, the controller 42 limits the output of the driving unit 80 to a predetermined normal operation time t1 before the calculated expected collision time (i.e., TTC), and operates the braking unit 90.

However, in the FCA system preemptive operation mode, the controller 42 may limit the output of the driving unit 80 at preemptive time t2 before the normal operation time t1, and operate the braking unit 90.

For example, the preemptive time t2 may be set to twice the normal operation time t1, but is not limited thereto.

If there is a standing passenger in the vehicle or there is an unbuckled passenger, and if the FCA system 44 operates at the normal time t1, the passenger (e.g., the standing passenger or unbuckled passenger) may slip or fall and be injured. However, in the FCA system preemptive operation mode, the controller 42 limits the output of the driving unit 80 in advance at the preemptive time t2 and operates the braking unit 90 to ensure passenger safety.

For example, in the FCA system normal mode, the FCA system 44 is operated one second before the expected collision time considering the current vehicle speed and the distance to the vehicle or pedestrian. On the other hand, in the FCA system preemptive operation mode, the FCA system 44 may be operated in advance two seconds before the expected collision time.

The figures are for convenience of understanding, but is not limited thereto.

In the FCA system preemptive operation mode, the controller 42 may operate the FCA system 44 by applying a predetermined preemptive vehicle deceleration rate a2 that is further reduced than a predetermined vehicle deceleration rate a1 in the FCA system normal mode.

For example, the preemptive vehicle deceleration rate a2 may be ½ of the vehicle deceleration rate a1, but is not limited thereto.

For example, if the vehicle deceleration rate in normal state a1 is −6 m/s2, the preemptive vehicle deceleration rate a2 is set to −3 m/s2 to reduce the inertia force applied to the passenger to promote passenger safety.

The figures are for convenience of understanding, but is not limited thereto.

Referring to FIG. 1, the vehicle passenger accident prevention system according to an embodiment of the present disclosure may further include an advanced smart cruise control system 46 (Hereinafter, it is called 'ASCC system') having a function of maintaining an inter-vehicle distance with the front vehicle.

The ASCC system 46 drives at a constant speed at the speed set by the driver when there is no preceding vehicle according to the output signal of the vehicle speed sensor 18, the distance sensor 20 and the optical camera 22, and the ASCC system 46 detects the speed and distance of the front vehicle when the preceding vehicle is recognized and controls the distance between the vehicle and the vehicle ahead.

Since the configuration and operation of a general ASCC system is obvious to those having ordinary skill in the art, a detailed description thereof has been omitted.

The control mode may further include an inter-vehicle distance preemptive operation mode to operate the ASCC system 46 in advance before the operation of the FCA system 44 when it is determined to correspond to the operation condition of the FCA system 44 according to the output signal of the vehicle operation status measurement unit 10, it is determined that there is a standing passenger in the vehicle or there is an unbuckled passenger according to the output signal of the vehicle operation status measurement unit 10, and it is determined to correspond to a predetermined inter-vehicle distance preemptive operation condition according to the output signal of the vehicle operation status measurement unit 10.

The controller 42 calculates the collision duration according to the signals output from the vehicle speed sensor 18 and the distance sensor 20, and if the calculated collision duration is longer than the predetermined collision duration, the controller 42 determines that the vehicle-to-vehicle distance preemptive operation mode is applicable.

In other words, if the calculated current collision duration is less than or equal to the predetermined collision duration, the FCA system 44 is operated to avoid the collision, and if the calculated current collision duration is longer than the predetermined collision duration, the ASCC system 46 is operated in advance. So that the speed of the vehicle can be reduced gradually.

For example, the predetermined collision duration may be the preemptive time t2 in the FCA system preemptive operation mode, and if the calculated current collision duration t3 is less than or equal to the preemptive time t2, the FCA system 44 is operated. And if the calculated current collision duration t3 is longer than the preemptive time t2, the ASCC system 46 may be operated in advance to reduce the vehicle speed gradually.

In the inter-vehicle distance preemptive operation mode, the controller may operate the ASCC system by applying a predetermined inter-vehicle distance longer than the predetermined inter-vehicle distance in the FCA system normal mode.

For example, if there is no standing passenger in the vehicle and there is no unbuckled passenger, according to the output signal of the vehicle speed sensor 18 and the distance sensor 20, the controller 42 operates the ASCC system 46 when the distance to the vehicle in front is a predetermined distance L1 in consideration of the speed difference between the vehicle in front and the vehicle.

However, if there is a standing passenger in the vehicle or there is an unbuckled seat belt, according to the output signal of the vehicle speed sensor 18 and the distance sensor 20, the controller 42 operates the ASCC system 46 when the distance to the vehicle in front is a predetermined distance L2 in consideration of the speed difference between the vehicle in front and the vehicle in advance.

For example, the inter-vehicle distance L2 in the preemptive operation mode may be twice the predetermined distance L1 under normal circumstances.

If there is a standing passenger, etc., if the ASCC system 46 is operated in advance, the inertia force applied to the passenger can be reduced to promote passenger safety.

The vehicle operation status measurement unit 10 may further include: an outside temperature sensor 24 that measures the outside temperature and outputs the corresponding signal; a rain sensor 26 detecting rain, snow, etc. and outputting the corresponding signal; and a blind spot detection warning system 29 (Hereinafter, it is called 'BSD system') that detects the presence of objects around the vehicle and outputs the corresponding signal.

The control mode may further include an environment preemptive operation mode to operate the ASCC system 46 in advance before the operation of the FCA system 44 when it is determined to correspond to the operation condition of the FCA system 44 according to the output signal of the vehicle operation status measurement unit 10, it is determined that there is a standing passenger in the vehicle or there is an unbuckled passenger according to the output signal of the vehicle operation status measurement unit 10, and it is determined to correspond to a predetermined environmental preemptive operation condition according to the output signal of the vehicle operation status measurement unit 10.

The controller 42 may determine whether it corresponds to the environment preemptive operation mode according to the output signal of the outside temperature sensor 24, the rain sensor 26 or the blind spot detection warning system 29.

For example, the environment preemptive operation mode is a mode that operates when the weather is bad, such as rain or snow, or when another vehicle approaches next to the vehicle. By reducing the speed, the inertia force applied to the passenger can be reduced and the safety of the passenger can be promoted.

When it is determined that the controller 42 corresponds to the environment preemptive operation mode, the controller 42 may control the operation of the ASCC system 46 to reduce the vehicle speed to a predetermined speed.

For example, the controller 42 may promote passenger safety by reducing the vehicle speed in advance by setting the target vehicle speed to ½ of a predetermined vehicle speed when the weather is clear and there is no adjacent vehicle.

The controller 42 may be implemented by one or more microprocessors (e.g., ECU (Engine Control Unit or Electronic Control Unit) operating according to a set program, and the set program may include a series of instructions for performing a method according to an embodiment of the present disclosure to be described later.

The instruction may be stored in a memory 50.

In FIG. 1, the controller 42, the FCA system 44 and the ASCC system 46 are indicated as separate configurations, but are not limited thereto.

In other words, the controller 42, the FCA system 44 and the ASCC system 46 may perform each function as a physically separated and separate configuration, or the controller 42, the FCA system 44 and/or the ASCC system 46 may perform each function as one integrated controller 40.

In addition, in FIG. 2, the display system 100 may display a warning or operation status during the operation of the FCA system 44 and the ASCC system 46.

Figure 3:
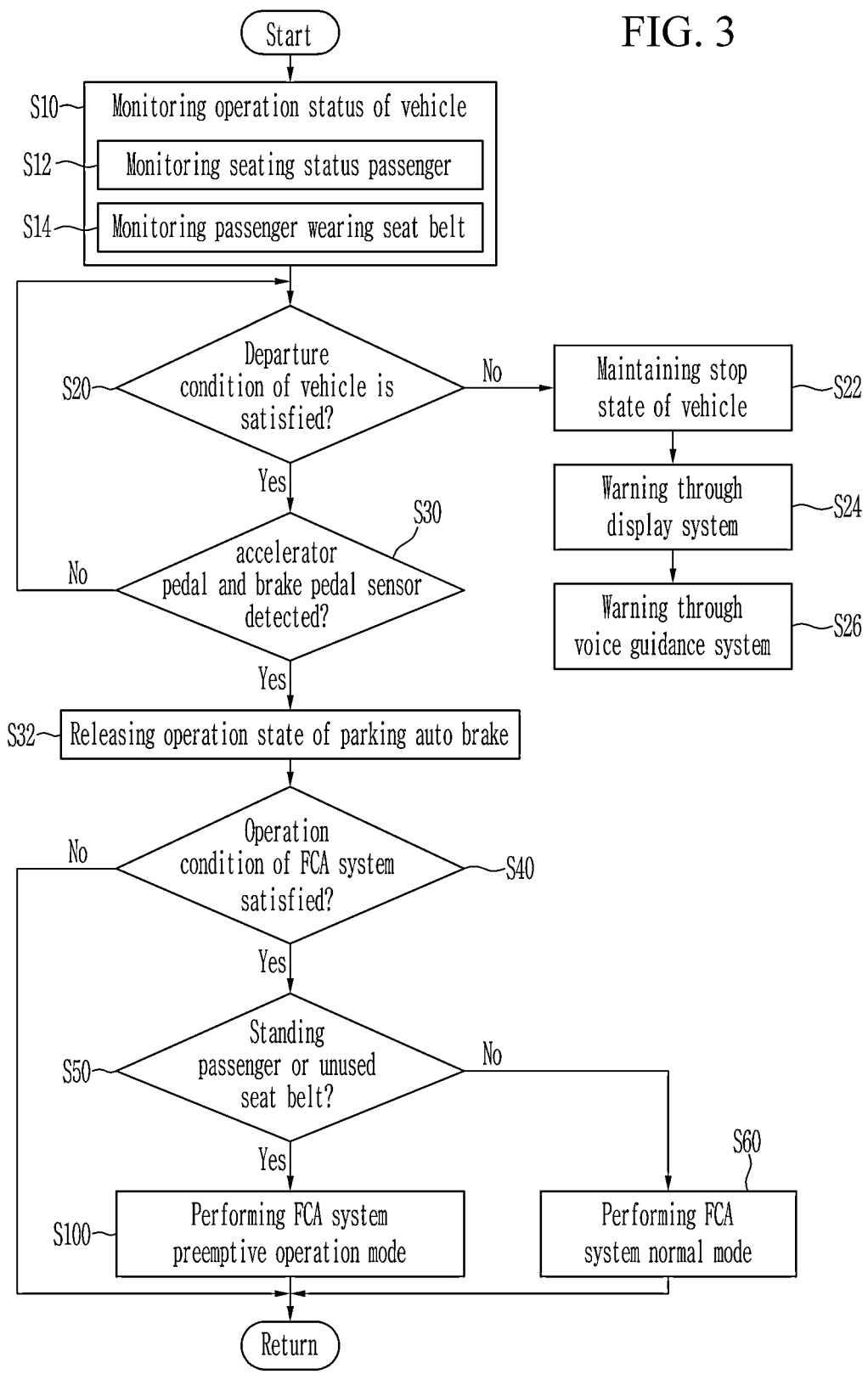
FIG. 3 and FIG. 4 are flowcharts showing a control method of a vehicle passenger accident prevention system according to an embodiment of the present disclosure.
Figure 4:
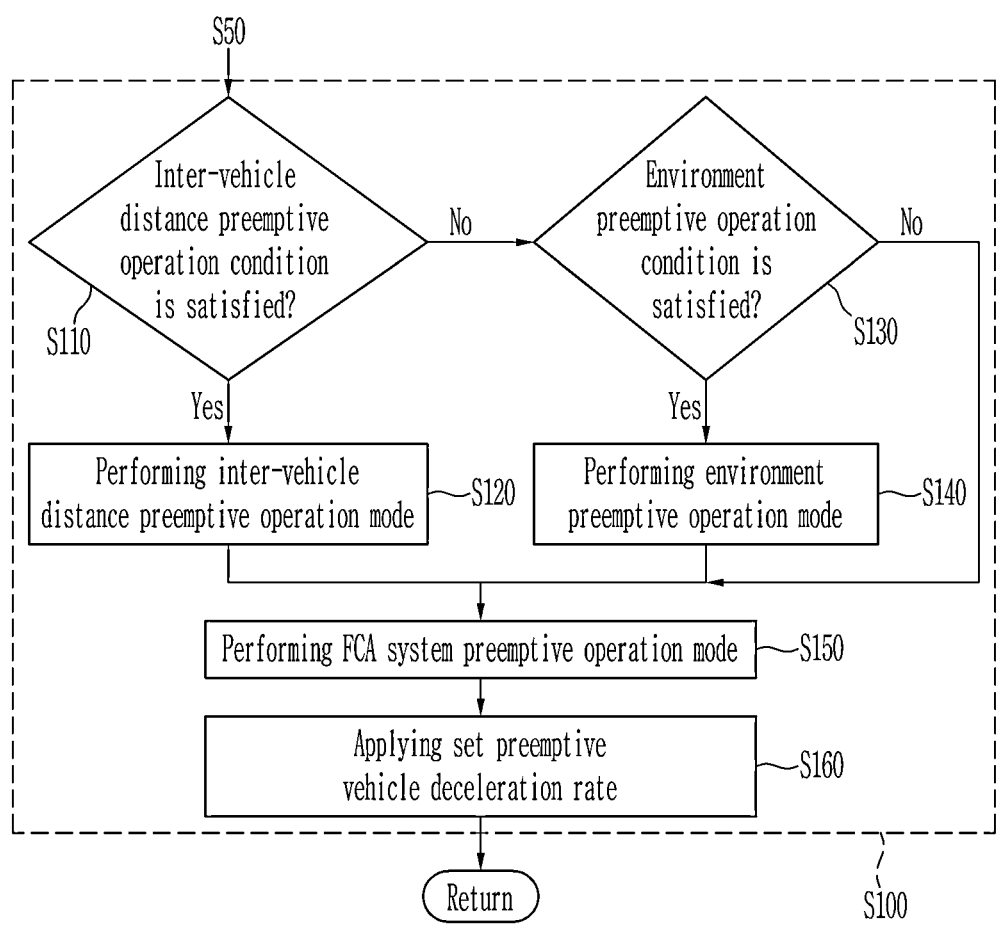

FIG. 3 and FIG. 4 are flowcharts showing a control method of a vehicle passenger accident prevention system according to an embodiment of the present disclosure.

Hereinafter, referring to FIG. 1 to FIG. 4, a control method of a vehicle passenger accident prevention system according to an embodiment of the present disclosure is described below.

The control method may be applied to the vehicle passenger accident prevention system according to the embodiment of the present disclosure described above.

When the vehicle departures, the vehicle operation status measurement unit 10 monitors the operation status of the vehicle, and outputs the corresponding signal to the controller 42 or the integrated controller 40 at step S10.

The controller 42 may monitor the seating status of the passenger in the vehicle at step S12.

For example, the controller 42 may determine the seated state of a passenger in the vehicle by subtracting the number of seated passengers detected by the sitting detecting sensor 14 from the number of passengers in the vehicle detected by the passenger count sensor 12.

Also, the controller 42 may monitor whether the passenger is wearing the seat belt at step S14.

For example, the controller 42 may determine the wearing state of the seat belt of the corresponding seat according to output signals of the sitting detecting sensor 14 and the belt wearing detecting sensor 16.

The controller 42, the FCA system 44 and/or the ASCC system 46 may perform each function as one integrated controller 40, but for better comprehension, the controller 42, the FCA system 44 and the ASCC system 46 are described as separate and separate configurations.

The control method of the vehicle passenger accident prevention system according to an embodiment of the present disclosure may include determining whether the controller 42 satisfies a departure condition of the vehicle before departure of the vehicle at step S20, and controlling the operation of the driving unit 80 and the braking unit 90 to prohibit the vehicle from starting if the controller 42 determines that the vehicle's departure condition is not satisfied at step S22

The step S22 may also include maintaining an operation state of a parking auto brake.

For example, if the controller 42 determines that there is a standing passenger in the vehicle or there is an unbuckled seat belt indicating an unbuckled passenger, it is determined that the departure condition of the vehicle is not satisfied at step S20, and the departure of the vehicle may be prohibited at step S22.

In addition, the controller 42 may warn this through the display system 100 at step S24 and guide it through the voice guidance system 110 at step S26.

If the controller 42 determines that the vehicle's departure condition is satisfied at step S20, the controller 42 detects the operation status of the accelerator pedal sensor 30 and the brake pedal sensor 32 to confirm the driver's will to start at step S30, then the controller 42 may release the operation state of the parking auto brake according to the output signal of the accelerator pedal sensor 30 at step S32.

Here, the vehicle operation status measurement unit 10 monitors the operation status of the vehicle in real time, and maintains the output of the corresponding signal to the controller 42 or the integrated controller 40.

While driving the vehicle, the controller 42 determines whether it corresponds to the operation condition of the FCA system 44 at step S40.

In other words, the controller 42 may determine whether the FCA system 44 corresponds to the operation condition in considering whether a collision is expected according to the output signals of the vehicle speed sensor 18, the distance sensor 20 and the optical camera 22.

The controller 42 determines the seated state of the passenger in the monitored vehicle and the state of wearing the seat belt of the corresponding seat at step S50.

In other words, the controller 42 determines the seated state of a passenger in the vehicle by subtracting the number of seated passengers detected by the sitting detecting sensor 14 from the number of passengers detected by the passenger count sensor 12. The controller 42 also determines the wearing state of the seat belt of the corresponding seat according to the output signals of the sitting detecting sensor 14 and the belt wearing detecting sensor 16 at step S50.

If the controller 42 determines that the operation condition of the FCA system 44 is satisfied at step S40 and there is no standing passenger in the vehicle, and there is no unbuckled passenger at step S50, the controller 42 performs the FCA system normal mode to operate the FCA system 44 normally at step S60.

If it is determined that the operation condition of the FCA system 44 is satisfied at step S40, and it is determined that there is a standing passenger in the vehicle or there is an unused seat belt indicating an unbuckled passenger in S50, the FCA system preemptive operation mode is performed at step S100.

As described above, in the FCA system preemptive operation mode, the controller 42 limits the output of the driving unit 80 at preemptive time t2 before the normal operation time t1, and operates the braking unit 90 in advance to prevent rapid braking of the vehicle.

Hereinafter, referring to FIG. 4, the operation of the FCA system preemptive operation mode of the vehicle including the ASCC system 46 is described.

As described above, in the vehicle including the ASCC system 46, the ASCC system 46 may be operated in advance prior to the operation of the FCA system 44.

In the control method, the controller 42 calculates the collision duration according to the signals output from the vehicle speed sensor 18 and the distance sensor 20 and compares it with the predetermined collision duration to determine whether the predetermined inter-vehicle distance preemptive operation condition is satisfied at step S110.

In the inter-vehicle distance preemptive operation condition, if the calculated collision duration t3 described above is longer than the predetermined collision duration t2, it is determined that the inter-vehicle distance preemptive operation condition is satisfied. The controller 42 may perform an inter-vehicle distance preemptive operation mode in which the ASCC system 46 operates in advance before the operation of the FCA system 44 at step S120.

The controller 42 may determine whether the environment preemptive operation condition is satisfied at step S130, and then the controller 42 perform the environment preemptive operation mode at step S140

As described above, the controller 42 may determine whether it corresponds to the environment preemptive operation mode according to the output signal of the outside temperature sensor 24, the rain sensor 26 or the blind spot detection warning system 29.

If the controller 42 is judged to correspond to the environment preemptive operation mode, the controller 42 controls the operation of the ASCC system 46 to reduce the vehicle speed, for example, the vehicle speed in advance than the vehicle speed under normal circumstances to promote passenger safety.

Thereafter, the controller 42 operates the FCA system 44 in advance at step S150, and at this time, the controller 42 applies the set preemptive vehicle deceleration rate a2 to operate the FCA system 44 at step S160.

As described above, according to the vehicle passenger accident prevention system and the control method for the same according to an embodiment of the present disclosure, the safety accident of the passenger may be prevented by determining whether the vehicle is in a departure possible state, and while the vehicle is operating, and it is possible to secure a safe distance from other vehicles by limiting the speed of the vehicle.

In addition, according to the additional function operation of the FCA system 44, it is possible to protect the passenger by reducing the vehicle speed and vehicle deceleration rate compared to the normal operation, and to prevent the safety accident of the passenger standing in the vehicle during the FCA system 44 operation.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

| <Description of symbols> | |
| --- | --- |
| 10: vehicle operation status measurement unit | |
| 12: passenger count sensor | |
| 14: sitting detecting sensor | 16: belt wearing detecting sensor |
| 18: vehicle speed sensor | 20: distance sensor |
| 22: optical camera | 24: outside temperature sensor |
| 26: rain sensor | 28: BSD system |
| 30: accelerator pedal sensor | 32: brake pedal sensor |
| 40: integrated controller | 42: controller |
| 44: FCA system | 46: ASCC system |
| 50: memory | 80: driving unit |
| 90: braking unit | 100: display system |
| 110: voice guidance system. | |

What is claimed is:

1. A vehicle passenger accident prevention system comprising:
   a vehicle operation status measurement unit configured to measure an operation state of a vehicle and output corresponding signals;
   a driving unit configured to drive the vehicle;
   a braking unit configured to brake the vehicle;
   a forward collision avoidance assist (FCA) system configured to control an operation of the driving unit and the braking unit;
   a controller configured to:
      detect a seated state of a passenger in the vehicle or a wearing state of a seat belt according to the output signals of the vehicle operation status measurement unit, and
      control the operation of the FCA system according to a predetermined control mode when a standing passenger in the vehicle is detected or an unbuckled passenger is detected; and
   an advanced smart cruise control system (ASCC) system having a function of maintaining an inter-vehicle distance with a front vehicle, and
   wherein the predetermined control mode further comprises:
      an inter-vehicle distance preemptive operation mode to operate the ASCC system in advance before the operation of the FCA system when the controller determines that the operation state corresponds to an operation condition of the FCA system according to the output signals of the vehicle operation status measurement unit, that there is a standing passenger in the vehicle or there is an unbuckled passenger according to the output signals of the vehicle operation status measurement unit, and that the operation state corresponds to a predetermined inter-vehicle distance preemptive operation condition according to the output signals of the vehicle operation status measurement unit.

2. The vehicle passenger accident prevention system of claim 1, wherein the vehicle operation status measurement unit comprises:
   a passenger count sensor configured to detect a passenger when the passenger enters or leaves the vehicle and further configured to output a corresponding output signal;
   a sitting detecting sensor configured to detect whether a passenger is seated in a seat and output a corresponding signal; and
   a belt wearing detecting sensor configured to detect whether a seat belt is buckled and output a corresponding signal, and
   wherein the controller is further configured to:
      determine the seated state of a passenger in the vehicle by subtracting a number of seated passengers detected by the sitting detecting sensor from a number of passengers detected by the passenger count sensor, and
      determine the wearing state of the seat belt of the corresponding seat according to output signals of the sitting detecting sensor and the belt wearing detecting sensor.

3. The vehicle passenger accident prevention system of claim 2, further comprising:
   a display system configured to display the seated state of the passenger in the vehicle or the wearing state of the seat belt of the seat.

4. The vehicle passenger accident prevention system of claim 3, wherein the display system displays an operating state of the FCA system.

5. The vehicle passenger accident prevention system of claim 3, further comprising:
   a voice guidance system configured to warn the wearing state of the seat belt of the seat or the seated state of the passenger in the vehicle.

6. The vehicle passenger accident prevention system of claim 2, wherein the vehicle operation status measurement unit further comprises:
   a vehicle speed sensor configured to measure a vehicle speed and output a corresponding signal;
   a distance sensor configured to measure a distance to the front vehicle and output a corresponding signal; and
   an optical camera configured to capture surrounding images of the vehicle and output a corresponding signal, and
   wherein the controller determines whether the operation condition of the FCA system is satisfied according to the output signals of the vehicle speed sensor, the distance sensor and the optical camera.

7. The vehicle passenger accident prevention system of claim 6, wherein the predetermined control mode comprises:
   an FCA system preemptive operation mode to operate the FCA system in advance when the controller determines that there is a standing passenger in the vehicle or there is an unbuckled passenger according to the output signals of the vehicle operation status measurement unit.

8. The vehicle passenger accident prevention system of claim 7, wherein the predetermined control mode further comprises:
   an FCA system normal mode to operate the FCA system normally when the controller determines that the operation condition of the FCA system is satisfied according to the output signals of the vehicle operation status measurement unit and that there is no standing passenger in the vehicle and there is no unbuckled passenger according to the output signals of the vehicle operation status measurement unit.

9. The vehicle passenger accident prevention system of claim 8, wherein
   in the FCA system preemptive operation mode, the controller operates the FCA system by applying a predetermined preemptive collision duration that is larger than a predetermined collision duration in the FCA system normal mode.

10. The vehicle passenger accident prevention system of claim 8, wherein
   in the FCA system preemptive operation mode, the controller operates the FCA system by applying a predetermined preemptive vehicle deceleration rate that is smaller than a predetermined vehicle deceleration rate in the FCA system normal mode.

11. The vehicle passenger accident prevention system of claim 7, wherein
   the controller calculates a collision duration according to the signals output from the vehicle speed sensor and the distance sensor, and when the calculated collision duration is longer than a predetermined collision duration, the controller determines that a vehicle-to-vehicle distance preemptive operation mode is applicable.

12. The vehicle passenger accident prevention system of claim 7,
   wherein the predetermined control mode further comprises
      an environment preemptive operation mode to operate the ASCC system in advance before the operation of the FCA system when the controller determines that the operation state corresponds to the operation condition of the FCA system according to the output signals of the vehicle operation status measurement unit, that there is a standing passenger in the vehicle or there is an unbuckled passenger according to the output signals of the vehicle operation status measurement unit, and that the operation state corresponds to a predetermined environmental preemptive operation condition according to the output signals of the vehicle operation status measurement unit.

13. The vehicle passenger accident prevention system of claim 12, wherein the vehicle operation status measurement unit further comprises:
   an outside temperature sensor configured to measure an outside temperature and output a corresponding signal;
   a rain sensor configured to detect at least one of rain or snow and output a corresponding signal; and
   a blind spot detection (BSD) system configured to detect a presence of objects around the vehicle and output a corresponding signal, and
   wherein the controller determines the environment preemptive operation mode is satisfied according to the output signal of the outside temperature sensor, the rain sensor or the BSD system.

14. The vehicle passenger accident prevention system of claim 13, wherein
   the controller controls the operation of the ASCC system to reduce the vehicle speed to a predetermined speed when the controller determines the environment preemptive operation mode is satisfied.

15. The vehicle passenger accident prevention system of claim 1, wherein
   in the inter-vehicle distance preemptive operation mode, the controller operates the ASCC system by applying a predetermined inter-vehicle distance longer than the predetermined inter-vehicle distance in a FCA system normal mode.

16. A control method for a vehicle passenger accident prevention system, the vehicle passenger accident prevention system including: a vehicle operation status measurement unit having a passenger count sensor which detects a passenger when the passenger enters or leaves a vehicle and outputs a corresponding output signal, a sitting detecting sensor that detects whether a passenger is seated in a seat and outputs a corresponding signal, a belt wearing detecting sensor that detects whether a seat belt is buckled and outputs a corresponding signal, a vehicle speed sensor that measures a vehicle speed and outputs a corresponding signal, a distance sensor that measures a distance to a front vehicle and outputs a corresponding signal, and an optical camera that captures an image around the vehicle and outputs a corresponding signal, and a driving unit to drive the vehicle, a braking unit to brake the vehicle, a forward collision avoidance assist (FCA) system that controls an operation of the driving unit and the braking unit, and a controller that detects a seated state of a passenger in the vehicle or a wearing state of a seat belt according to the output signals of the vehicle operation status measurement unit, the control method comprising:
  determining, by the controller, the seated state of a passenger in the vehicle by subtracting a number of seated passengers detected by the sitting detecting sensor from a number of passengers detected by the passenger count sensor;
  determining, by the controller, the wearing state of the seat belt of the corresponding seat according to the output signals of the sitting detecting sensor and the belt wearing detecting sensor;
  determining, by the controller, an operation condition of the FCA system based on whether a collision is expected according to the output signals of the vehicle speed sensor, the distance sensor and the optical camera;
  performing, by the controller, an FCA system normal mode to operate the FCA system normally when the controller determines the operation condition of the FCA system and there is no standing passenger in the vehicle, and there is no unbuckled passenger in the vehicle;
  performing, by the controller, an FCA system preemptive operation mode by applying a predetermined preemptive collision duration that is larger than a predetermined collision duration in the FCA system normal mode and applying a predetermined preemptive vehicle deceleration rate that is smaller than a predetermined vehicle deceleration rate in the FCA system normal mode when the controller determines that the operation condition of the FCA system is satisfied, and that there is a standing passenger in the vehicle or there is an unbuckled passenger in the vehicle; and
  performing, by the controller, an inter-vehicle distance preemptive operation mode to operate an advanced smart cruise control (ASCC) system in advance before the operation of the FCA system when the controller determines that the operation state corresponds to the operation condition of the FCA system according to the output signals of the vehicle operation status measurement unit, that there is a standing passenger in the vehicle or there is an unbuckled passenger according to the output signals of the vehicle operation status measurement unit, and that the operation state corresponds to a predetermined inter-vehicle distance preemptive operation condition according to the output signals of the vehicle operation status measurement unit.

17. The control method of claim 16, further comprising:
performing, by the controller, an environment preemptive operation mode to operate the advanced smart cruise control (ASCC) system in advance before the operation of the FCA system when the controller determines that the operation state corresponds to a predetermined environmental preemptive operation mode according to output signals of an outside temperature sensor, a rain sensor or a blind spot detection (BSD) system.

18. The control method of claim 16, further comprising:
controlling, by the controller, the operation of the driving unit and the braking unit to prohibit departure of the vehicle when the controller determines that there is a standing passenger in the vehicle or there is an unbuckled passenger before departure of the vehicle.

* * * * *